United States Patent Office 3,552,979
Patented Jan. 5, 1971

3,552,979
PROCESS OF COATING AND ROASTING NUTS
Norman F. Kruse, Park Forest, Ill., assignor to CPC International Inc., New York, N.Y., a corporation of Delaware
No Drawing. Filed Aug. 25, 1967, Ser. No. 663,237
Int. Cl. A23b 9/00
U.S. Cl. 99—126                                    4 Claims

ABSTRACT OF THE DISCLOSURE

A process for treating nut meats is disclosed. The use of a molten sorbitol rich blend of sorbitol-mannitol for preheating nut meats prior to roasting is disclosed.

---

The present invention relates to improvements in a process for treating nut meats such as shelled peanuts. In general, it concerns a preheating step employed prior to roasting nut meats. In particular, it concerns the use of a molten sorbitol rich blend of sorbitol-mannitol as the preheating media in a nut roasting process.

In commonly assigned co-pending application, Ser. No. 578,487 filed Sept. 12, 1966, there is disclosed an improved nut meat which contains a coating comprising a blend of about 90 to 50% mannitol and about 10 to 50% sorbitol. The entire disclosure in said application is incorporated herein by reference. In said application a process for preparing the nut meats is disclosed which process involves immersing the nut meats in a mannitol rich molten blend of sorbitol and mannitol.

It has now been discovered that the use of a certain preheating step, as further described hereinafter, affords several advantages in preparing the nuts described in said co-pending application.

It is a primary object of the present invention to provide an improved process for preparing nut meats which contain a coating of mannitol and sorbitol.

Other objects will be apparent to those skilled in the art from the disclosure that follows.

When nut meats are immersed in a molten mannitol rich blend of mannitol and sorbitol for coating and/or roasting, the temperature of the blend is generally in excess of about 300° F., for example 325° to 350° F. As disclosed in co-pending application, Ser. No. 578,487, prior to immersing the nut in a blend at these temperatures the nut meats are usually preheated from room temperature up to a temperature somewhat lower than the temperature of the blend. Preheating in air to a temperature of about 250° to 275° F. is described in said co-pending application. It has now been discovered that certain unexpected benefits occur when, instead of preheating in air, the preheating is accomplished in a molten sorbitol rich blend of sorbitol and mannitol.

One advantage of preheating with a molten sorbitol rich blend of sorbitol and mannitol as compared to preheating in air is that greater uniformity of temperature within a batch and also among batches is achieved. Surrounding the nuts with a liquid heating media tends to minimize overheating surface nuts while underheating those in the center of the mass. The liquid preheat also helps maintain the temperature while transferring nuts between the preheat and roasting or coating steps. Another advantage of the present invention is that nut breakage and splitting is significantly reduced as compared to when air preheating is used. Air preheating requires thorough mixing during the preheating step to insure temperature uniformity prior to roasting so that the uniformity of the roasted product is accepted. Nuts, particularly peanuts, are very fragile when raw and the mixing required when preheating in air produces objectionable broken nuts and splits. A further advantage of the molten sorbitol rich blend of sorbitol and mannitol for preheating is that the preheating time is relatively short. The higher heat transfer coefficient of the molten blend versus an air film enables the preheat step of this invention to be completed in a shorter time than an air preheat step.

In general, the preheating step of the present invention comprises suspending raw nuts in a molten sorbitol rich blend of sorbitol and mannitol for a time sufficient to bring the temperature of the nuts from ambient temperature to a temperature closely approaching the temperature of the blend.

In practice, the raw nuts are suspended in the molten bath by the use of a wire mesh basket. The molten bath will comprise a mixture of sorbitol and mannitol with sorbitol being present in an amount greater than about 50 weight percent based upon the total weight of the molten bath. In general, the bath will comprise between about 60 and 80% sorbitol and 20 to 40% mannitol. A preferred bath comprises about 70% sorbitol and 30% mannitol.

The temperature of the preheating bath will generally not exceed about 350° F. The particular temperature employed in any given nut roasting process will depend of course upon a number of factors including the particular nut meat employed, the specific composition of the preheating bath, and the degree of roasting desired during the preheating. In general, however, the temperature of the molten bath will be in the range of about 250° F. to 350° F., preferably 290° F. to 320° F.

The preheating time will be that time required to bring the nut meats from ambient temperature up to a temperature approximating the temperature of the molten bath. This time will generally be a matter of a few minutes; for example, about 30 seconds to ten minutes.

After the nut meats are preheated according to the present invention, they are further processed according to the disclosure in Ser. No. 578,487 to produce a nut meat containing a coating of about 50 to 90% mannitol and 10 to 50% sorbitol. Briefly and preferably, this further processing comprises immersing the preheated nut in a molten blend of a mannitol rich mixture of sorbitol and mannitol. Thus, the overall process of preparing coated nut meats which have a coating of about 50 to 90% mannitol and 10 to 50% sorbitol involves the use of two molten baths. The first bath, a preheating bath, is a molten sorbitol rich blend of sorbitol and mannitol. The second bath, a coating and/or roasting bath, is a molten mannitol rich blend of sorbitol and mannitol.

The present invention will be further understood by reference to the following example which is included for illustrative purposes only.

EXAMPLE

Raw peanuts are placed in a wire mesh roasting basket and suspended in a molten bath of 70% sorbitol and 30% mannitol maintained at about 320° F. for about 3 minutes. During this preheating step the nuts are heated from ambient temperature to a temperature approaching 320° F. During this preheating some moisture is driven off and some roasting begins. After 3 minutes the wire mesh basket containing the preheated nuts is withdrawn from the preheating bath and suspended in a roasting tank containing a molten bath of about 80% mannitol and 20% sorbitol. The preheated nuts are suspended in the roasting tank for about 1 minute at a temperature of about 340° F. At the end of this time, the basket is removed from the tank and the nuts are allowed to drain and cool.

Following substantially the same procedure set forth in the above example, cashews, almonds, filberts, and pecans were preheated according to the present invention.

Preheated temperatures of about 280 to 300° F. and preheat times of about 30 seconds to 3 minutes were employed. In all instances the final products obtained were superior to nut meats preheated in air.

While the invention has been described in connection with specific embodiments thereof, it will be understood that it is capable of further modifications and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention and the limits of the appended claims.

What is claimed is:

1. A process for preparing roasted nut meats that are coated with a solidified coating of a blend of mannitol and sorbitol that is rich in mannitol, comprising:
    (a) preheating raw nut meats by immersing them in a molten bath of a blend of sorbitol and mannitol that is rich in sorbitol, at a bath temperature in the range from about 290° F. to about 320° F., until the nuts are heated substantially to the temperature of the bath;
    (b) roasting the preheated nuts in a molten bath of a blend of sorbitol and mannitol that is rich in mannitol and that is at a temperature in the range from about 330° F. to about 350° F;
    (c) draining and cooling the roasted nut meats; and
    (d) recovering cooled roasted nut meats that are coated with a solidified layer of the blend.

2. The process of claim 1 wherein said blend of sorbitol and mannitol that is rich in sorbitol comprises about 60 to 80% sorbitol and 40 to 20% mannitol.

3. The process of claim 1 wherein said blend of sorbitol and mannitol that is rich in sorbitol comprises about 70% sorbitol and about 30% mannitol.

4. The process of claim 1 wherein the raw nut meats are preheated to a temperature of about 290° F. for a time of about 30 seconds to 3 minutes.

References Cited
UNITED STATES PATENTS

| | | | |
|---|---|---|---|
| 1,908,059 | 5/1933 | Sawin | 99—126 |
| 2,859,121 | 11/1958 | Avera | 99—126 |
| 3,253,930 | 5/1966 | Gould | 99—98X |
| 3,477,858 | 11/1969 | Wells | 99—126 |

FRANK W. LUTTER, Primary Examiner

R. HALPER, Assistant Examiner

U.S. Cl. X.R.

91—165